United States Patent [19]
Inoue et al.

[11] Patent Number: 6,089,847
[45] Date of Patent: Jul. 18, 2000

[54] GOLF BALL INJECTION MOLD

[75] Inventors: Michio Inoue; Keisuke Ihara, both of Chichibu, Japan

[73] Assignee: Bridgestone Sports Co., Ltd., Tokyo, Japan

[21] Appl. No.: 09/151,023

[22] Filed: Sep. 10, 1998

[30] Foreign Application Priority Data

Sep. 10, 1997 [JP] Japan ................................... 9-262862

[51] Int. Cl.[7] .......................... B29C 45/14; B29C 45/22; B29C 45/34
[52] U.S. Cl. ...................... 425/116; 264/278; 264/279.1; 264/328.12; 425/120; 425/573
[58] Field of Search ..................... 425/116, 120, 425/129.1, 573; 264/275, 278, 279.1, 328.12

[56] References Cited

U.S. PATENT DOCUMENTS

| | | | |
|---|---|---|---|
| 2,031,786 | 2/1936 | Oldham | 425/120 |
| 2,361,348 | 10/1944 | Dickson et al. | 425/116 |
| 4,959,000 | 9/1990 | Giza | 425/116 |

FOREIGN PATENT DOCUMENTS 63-199615  8/1988  Japan.

*Primary Examiner*—Robert Davis
*Attorney, Agent, or Firm*—Sughrue, Mion, Zinn, Macpeak & Seas, PLLC

[57] ABSTRACT

A golf ball injection mold defines a spherical cavity therein. A parting plane is situated substantially at an equator of the cavity. A plurality of gates are disposed nearly along the equator. At least one gate is disposed nearly at a position corresponding to the cavity's north pole and at least one gate disposed nearly at a position corresponding to the cavity's south pole. A molding material is injected from an injection molding machine into the cavity through the gates. A steric arrangement of gates adapted to the cavity geometry permits a cover or intermediate layer of a uniform thickness to be formed around a core.

5 Claims, 3 Drawing Sheets

GOLF BALL INJECTION MOLD

BACKGROUND OF THE INVENTION

1. Field of the Invention

This invention relates to a golf ball injection mold which permits a cover or intermediate layer of a uniform thickness to be formed around a core. It also relates to golf balls prepared using the mold.

2. Prior Art

As is well known, golf balls include balls of the wound type in which a rubber or resin cover stock is molded around a wound core formed by winding thread rubber around a center, and balls of the solid type in which a resin cover stock is molded around a solid core of solid elastomer.

Golf balls of the solid type (solid golf balls) were developed subsequent to golf balls of the wound type. In addition to the fact that solid golf balls essentially fly a longer distance when hit, improvements have been made on sold golf balls with respect to the control of the ball by the spin imparted thereto and the feel of the ball that the player gets when hitting the ball. Nowadays many players prefer the solid golf balls regardless of whether players are amateur or professional.

Injection molds are often used in preparing such solid golf balls, especially molding covers around cores. As shown in FIGS. 5A and 5B, a typical injection mold 1 defines a spherical cavity 2 having a plurality of dimple-forming projections (not shown) on its internal surface 2a. The spherical cavity 2 has an equator and opposed poles.

More particularly, the injection mold 1 includes a pair of upper and lower mold sections 1a and 1b which are removably mated along a parting plane or line P lying in substantial register with the equator of the cavity 2. A plurality of support pins 7 are disposed near each of the opposed poles of the cavity 2 for motion into and out of the cavity 2 for supporting a preformed solid core 3 at the center of the cavity 2. In FIG. 5, four support pins 7 are arranged near each pole, totaling eight support pins. An annular runner 4 nearly surrounding the cavity equator is provided in the mold 1. A plurality of (eight in FIG. 5) gates 5 equi-spaced along the equator, extend radially inward from the annular runner 4 and open to the cavity 2 for injecting a molding material into the cavity. With the solid core 3 supported at the cavity center by the support pins 7, a cover stock of thermoplastic resin (e.g., ionomer resin) is injected through the gates 5 into the space defined between the cavity surface 2a and the solid core 3, forming a cover around the core. The cover thus formed usually has a (radial) thickness of about 1.5 to 2.5 mm.

In FIGS. 5A and 5B, a main runner 6 provides fluid communication between the annular runner 4 and an injection molding machine. Vent holes 8 are drilled in the mold, and pins 9 are received in the holes 8 to define degassing gaps 10 therebetween, permitting gases and volatiles generated during molding to escape to the outside through the gaps 10.

When it is desired to mold a golf ball of a multilayer structure having an intermediate layer between a solid core and a cover, as in the molding of the cover, the intermediate layer may be formed by injecting a molding material such as a thermoplastic resin, followed by injection molding of a cover. In this case, the molding material is injected under a very high pressure of 1,000 to 3,000 kg/cm². Often, the thicknesses of the intermediate layer and the cover are somewhat less than the thickness of the first described cover (formed without the intermediate layer).

When the cover or intermediate layer is formed around the solid core using the injection mold described above, portions of the molding material, typically thermoplastic resin, injected through the gates flow through the narrow space between the solid core and the cavity surface and eventually join together to form an integral cover. In this flow process, the resin portions from adjacent gates join each other in latitudinal directions of the cavity because of the relatively short distance between the gates, advance in longitudinal directions, and finally integrate together near the opposed poles.

In the above-described mold, however, the gates are merely arranged at equal intervals in a plane in registration with the cavity equator. The injected resin must flow from the gate position (corresponding to the equator) to the final integration position (corresponding to the opposed poles), that is, a distance equal to about a quarter of the cavity circumferential length. If the resin is somewhat poor flowing, welds or chicken feet can be formed near the opposed poles, resulting in molding defects.

When it is desired to form the cover (or intermediate layer) to a reduced thickness of 1 mm or less, the high injection pressure of the resin causes the solid core to be deformed into an oval shape like a rugby ball. As a result, the thickness of the cover is increased near the equator and reduced near the opposed poles. In some cases, the core can be off centered so that the core is exposed at the ball surface.

SUMMARY OF THE INVENTION

Therefore, an object of the present invention is to provide a novel and improved golf ball injection mold in which gates opening to the cavity are three-dimensionally arranged so that a cover or intermediate layer of uniform thickness may be effectively formed around a core.

According to the invention, there is provided a golf ball injection mold defining therein a spherical cavity having an equator, a north pole and a south pole. The mold has a parting plane substantially at the cavity equator and includes a plurality of gates disposed nearly along the equator for injecting a molding material from an injection molding machine into the cavity. At least one gate is disposed nearly at a position corresponding to the cavity's north pole and at least one gate disposed nearly at a position corresponding to the cavity's south pole for injecting the molding material into the cavity. Throughout the specification, the term "nearly" indicates an exact position and the vicinity thereof, and hence, the phrase that the gate is disposed nearly at a position corresponding to the pole means that the gate is disposed at or in the vicinity of a position corresponding to the pole.

In one preferred embodiment, a gas vent is disposed in an area of each of the north and south hemispheres of the cavity that extends between latitudes of 30° and 60°. In another preferred embodiment, a plurality of core support pins are disposed for motion into and out of the cavity in an area of each of the north and south hemispheres of the cavity that extends between latitudes of 30° and 60°. A gas vent may be defined between each of the core support pins and a hole receiving the pin.

Also contemplated herein is a golf ball prepared using the mold.

Since the gates are disposed in the mold in a steric arrangement adapted to the cavity geometry, a cover or intermediate layer of uniform thickness can be effectively formed around a core.

More specifically, in a golf ball injection mold defining therein a spherical cavity, having a parting plane substantially at an equator of the cavity and comprising a plurality of molding material injecting gates disposed nearly along the equator, according to the invention, at least one molding material injecting gate is further disposed nearly at a position corresponding to each of the cavity north and south poles. When the resin is injected, a balance is established between the injection pressures of resin portions from plural gates, allowing the core to be situated substantially at the cavity center and preventing off-centering of the core. A golf ball having a cover or intermediate layer of uniform thickness can be effectively molded.

When a gas vent is disposed in an area of each of the north and south hemispheres of the cavity that extends between latitudes of 30° and 60°, or when a plurality of axially movable core support pins are disposed in an area of each of the north and south hemispheres of the cavity that extends between latitudes of 30° and 60° and a gas vent is defined between each of the core support pins and a hole receiving the pin, gases and volatiles generated during molding can be released outside just at positions where the resin portions injected from the gates merge with each other within the cavity. This minimizes the occurrence of weld lines or molding defects, providing improved moldability.

DETAILED DESCRIPTION OF THE INVENTION

Figure 1:
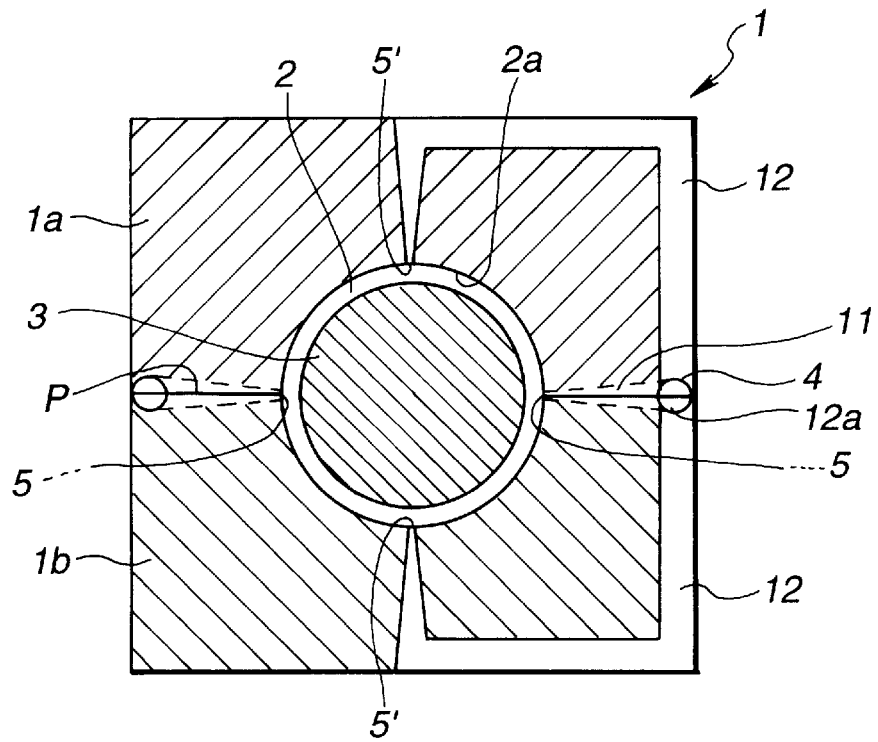
FIG. 1 is a cross-sectional view of a golf ball injection mold according to one embodiment of the invention.
Figure 2:
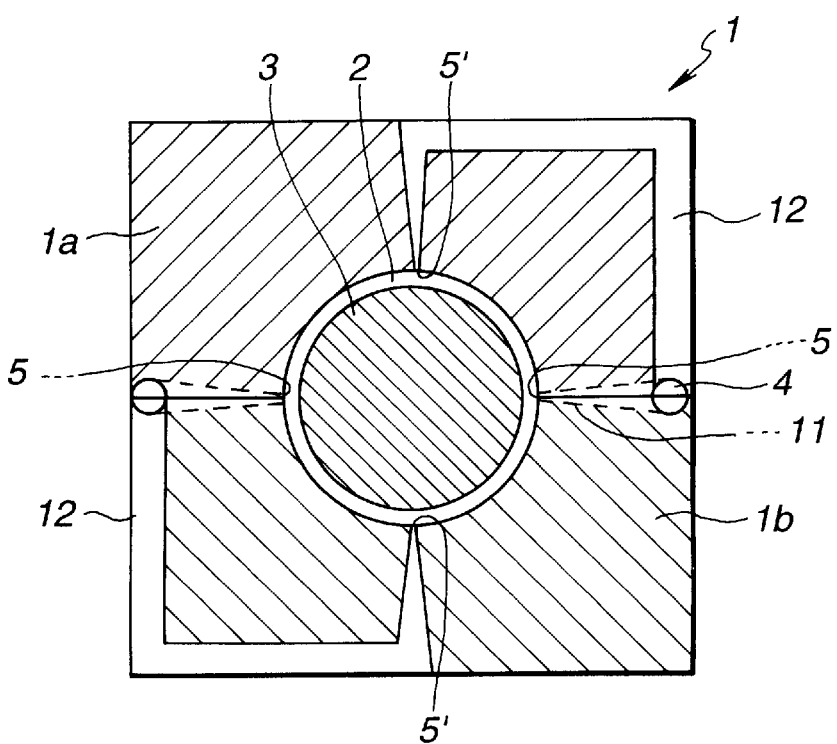
FIG. 2 is a cross-sectional view of an injection mold according to another embodiment of the invention.
Figure 3:
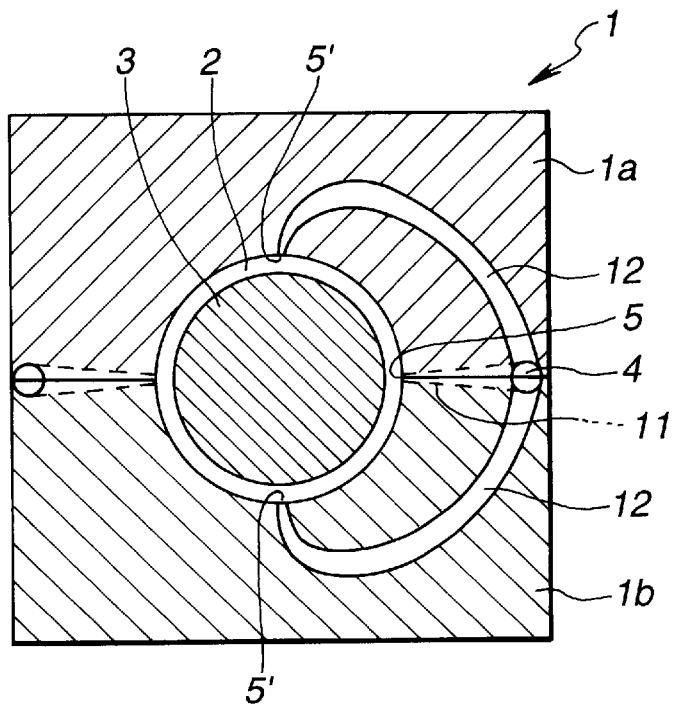
FIG. 3 is a cross-sectional view of an injection mold according to a further embodiment of the invention.
Figure 5A:
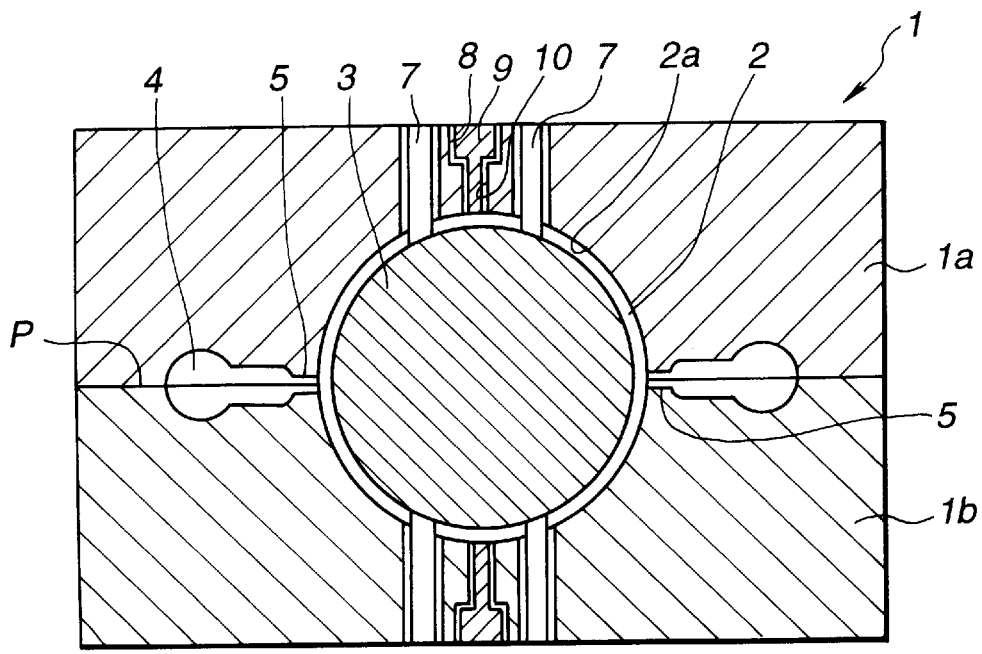
FIGS. 5A and 5B are vertical and horizontal cross-sectional views of a prior art golf ball injection mold.
Figure 5B:
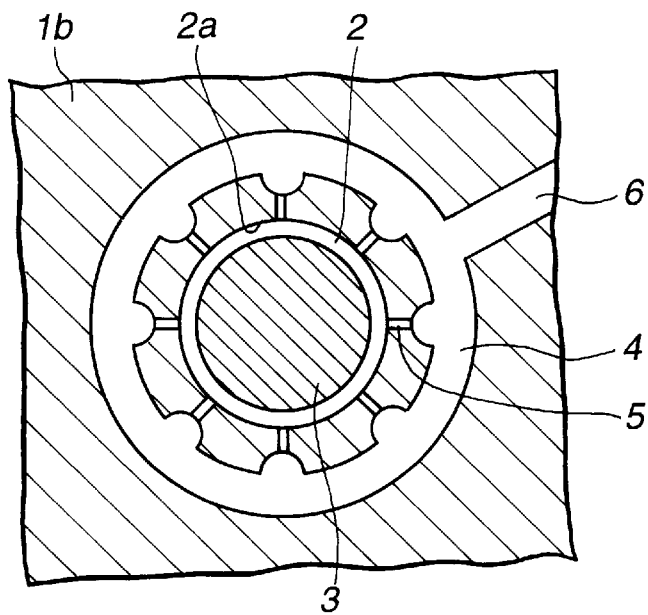

Referring to FIGS. 1, 2 and 3, there are illustrated golf ball injection molds according to different embodiments of the invention. The same elements as in the prior art mold of FIGS. 5A and 5B are represented by like numerals and their description is omitted.

First referring to FIG. 1, the mold 1 has an internal concave surface 2a defining a spherical cavity 2. The spherical cavity 2 has a center, an equator and opposed, north and south poles. The injection mold 1 includes a pair of upper and lower mold sections 1a and 1b which are removably mated along a parting plane or line P lying in substantial coincidence with the equator of the cavity 2. The cavity surface 2a is provided with a plurality of dimple-forming projections (not shown) for indenting dimples in a cover when the cover is injection molded. When the mold is used to form an intermediate layer, no dimple-forming projections are necessary and the cavity surface 2a is smooth.

The mold 1 includes an annular runner 4 nearly surrounding the cavity equator. A plurality of, preferably 4 to 12, nozzle-shaped runners 11 are circumferentially disposed along the inner periphery of the annular runner 4. The nozzle-shaped runners 11 extend approximately radially with respect to the cavity center and are provided at their inner ends with gates 5 which are open to the cavity 2. In one preferred embodiment, eight gates 5 are disposed at equal intervals nearly along the equator. A molding material can be injected from an injection molding machine (not shown) into the cavity through the gates.

In addition to the nozzle-shaped runners 11 which are circumferentially disposed along the inner periphery of the annular runner 4 nearly surrounding the cavity equator, the injection mold of this embodiment includes second runners 12 which extend from the annular runner 4 to the north and south poles of the cavity. More particularly, one end 12a of the second runner 12 is in fluid communication with the annular runner 4 and another end of the second runner 12 is provided with a molding material injecting gate 5' which is open to the cavity 2 nearly at a position corresponding to the north or south pole of the cavity. In the illustrated embodiment, one gate 5' is disposed at each of the north and south poles of the cavity. Instead, a plurality of (for example, two or three) gates may be disposed at equal intervals on a concentric circle within an area spaced some distance from each pole, for example, a northpolar or southpolar area (north latitude 60° to 90° or south latitude 60° to 90°).

In the illustrated embodiment, the second runners 12 each have a U-shape extending vertically from the annular runner 4, then horizontally and again vertically toward the pole. The gate 5' at the distal end of the second runner 12 extends substantially vertically and opens to the cavity 2 (or core 3) at the north or south pole.

The position 12a where the second runner 12 is connected to the annular runner 4 is not critical, but is preferably situated near the main runner and off the connections to the nozzle-shaped runners 11.

In the injection mold of the invention, by adjusting the inner diameters and lengths of the annular runner 4 nozzle-shaped runners 11 and second runners 12, the diameters of gates, and the injection pressure of the machine, the injection pressures of molding material portions injected through the respective gates can be controlled equal and appropriate. In most cases, the nozzle-shaped runners and the second runners are formed to an approximately equal inner diameter of about 2 to 6 mm, the gates are formed to a diameter of about 0.3 to 2 mm, and the injection pressure is set at about 1,000 to 3,000 kg/cm$^2$ although it varies with the type of molding material.

The second runners 12 are not limited to those shown in FIG. 1. For example, as shown in FIG. 2, two second runners 12 are located at diametrically opposed positions of the annular runner 4, with each second runner 12 having a U-shape extending vertically from the annular runner 4, then horizontally and again vertically toward the pole. One second runner 12 first extending vertically upward has at its distal end a gate opening at the north pole while the other second runner 12 first extending vertically downward has at its distal end a gate opening at the south pole.

In a further embodiment, as shown in FIG. 3, the second runners 12 are arc shape rather than the U shape. The second runners 12 of arc shape each extend curvilinearly from the annular runner 4 to the north or south pole.

Also in the embodiments shown in FIGS. 2 and 3, the gate at the distal end of each second runner vertically opens to the cavity 2 (or core 3) at the north or south pole. The inner diameters of the runners and the diameter of gates may be set as in the first embodiment.

Though not shown, the second runner may extend from a route different from the annular runner 4 to the north or south pole of the cavity 2 rather than diverting from the annular runner 4.

In the injection mold of the invention, the nozzle-shaped runners and second runners are sterically diverted from the common annular runner or the nozzle-shaped runners are diverted from the annular runner and second runners communicate with a route different from the annular runner, and molding material injecting gates at the distal ends of the runners are open to the cavity along the equator and at the opposed poles to define a steric gate arrangement more adapted to the cavity geometry. Then, the injection pressures of resin portions are maintained in equilibrium during injection so that the core is kept substantially at the center of the cavity and a golf ball having a cover (or intermediate layer) of a uniform thickness can be molded.

In the injection mold of the invention wherein the gate positions are optimized as described above, a vent or degassing hole is disposed at a position where resin portions injected from the gates merge with each other. Then gases and volatiles generated during molding can be quickly released outside, preventing occurrence of molding defects such as weld lines.

Figure 4:
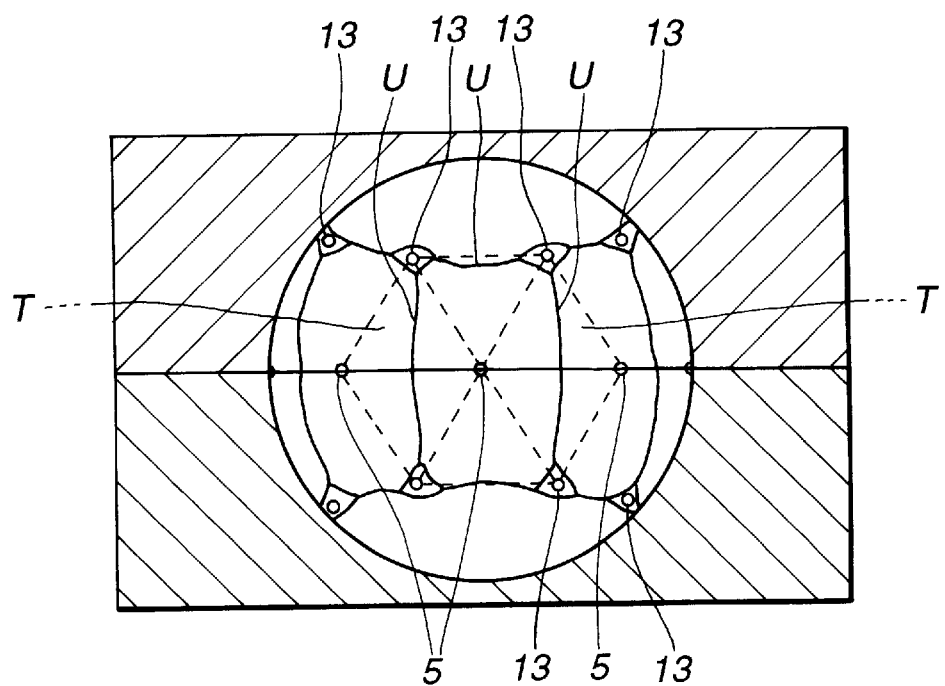
FIG. 4 is an imaginary side view showing an injection molded state in the mold of FIG. 1.

FIG. 4 is an imaginary side view illustrating the streams of molding material which is injected through the gates into the cavity of the injection mold of FIG. 1 where a solid core has been held in place, and the imaginary weld lines U along which the streams join together. In the mold of FIG. 1, eight gates 5 are arranged at equal intervals along the equator and one gate 5' is arranged at each of the north and south poles.

When a molding resin is injected into the mold cavity through the gates, the resin portions injected from the gates on the equator first merge with each other in a latitudinal direction due to the relatively short distance between the gates, and the imaginary weld lines U of merging extend upward and downward in a longitudinal direction. On the other hand, the resin portions injected from the gates at the north and south poles flow and diffuse in a concentric fashion toward the equator and merge with the resin portions flowing from the equator nearly at positions corresponding to a north latitude of 45° and a south latitude of 45°, forming imaginary weld lines U as shown in FIG. 4.

When the molding resin is injection molded in the mold of the invention, gases or volatiles are released therefrom and accumulate where the resin portions merge with each other. If the gases or volatiles are taken into the resin at such positions, it is likely that actual weld lines appear.

To prevent formation of actual weld lines, a plurality of gas vents are disposed in a latitudinal area corresponding to where the resin portions injected from the equator side merge with the resin portions injected from the north or south pole side. More specifically an area of each of the north and south hemispheres of the cavity that extends between latitudes of 30° and 60°, preferably 40° and 50°, preferably zones where latitudinal weld lines intersect with longitudinal weld lines. More preferably gas vents are disposed at the intersections between latitudinal weld lines and longitudinal weld lines, the number of gas vents being at least equal to the number of the intersections. In the example of FIG. 4, imaginary equilateral triangles T whose base is a line segment connecting two adjacent gates 5 on the equator are drawn, and seven gas vents 13 are positioned at the apexes of the triangles T substantially corresponding to a north latitude 45° or a south latitude 45° (fourteen gas vents in total). The gas vents are preferably in the form of slits of about 1 to 30 μm wide.

Though not shown in FIGS. 1 to 4, in the mold of the invention, core support pins are disposed in the vicinity of the opposed poles for motion into and out of the cavity for holding the solid core at the center of the cavity, as depicted at 7 in the prior art mold of FIG. 5A. In addition to or instead of the core support pins disposed in the vicinity of the opposed poles, at least one core support pin may be disposed for motion into and out of the cavity in an area of each of the north and south hemispheres of the cavity that extends between latitudes of 30° and 60° (at a north latitude of 45° and a south latitude of 45° in the example of FIG. 4), though not shown. The gap defined between each core support pin and a hole receiving the pin may serve as a gas vent. In the example illustrated in FIG. 4, the core support pins are not disposed at all the seven gas vents, but the support pins are disposed at every two gas vents, that is, at four gas vents while the remaining three gas vents are of the same pin/hole structure except that the pins are not movable into and out of the cavity. Whether the support pins are movable or immovable, the gap defined between each core support pin and a hole receiving the pin serves as a gas vent. Alternatively, the remaining gas vents are of the slit type mentioned above.

By providing gas vents nearly at the positions where the molding material portions merge with each other (the gas vents may be either the slit type or the support pin/hole structure), gases or volatiles accumulated there can be quickly released from within the cavity, preventing formation of molding defects such as weld lines.

When a cover is injection molded around a core using the injection mold of the invention, the injection molding procedure and conditions are not critical and conventional procedures may be used. For example, with the upper and lower mold sections 1a and 1b removably mated as shown in FIG. 1, a molding material is injected from an injection molding machine (not shown) into the space between the core 3 and the cavity surface 2a through the annular runner 4, nozzle-shaped runners 11 and second runners 12, and sterically arranged gates 5 and 5' opening at the equator and opposed poles. Immediately before or at the same time as the completion of injection, the support pins (7) are retracted to be flush with the cavity surface. In this way, the cover is molded around the core to form a golf ball.

Since the injection mold of the invention permits a molding material to be injected under equal pressure through the sterically arranged gates, the core is not off-centered and a cover or intermediate layer of a uniform thickness can be formed.

The injection mold of the invention is suitable when a cover is formed around a core, when an intermediate layer is formed around a core, and when a cover is formed around the intermediate layer. The golf balls molded using the injection mold of the invention may be either wound golf balls or solid golf balls. They are preferably two-piece solid golf balls consisting of a solid core and a cover, three-piece solid golf balls consisting of a solid core, an intermediate layer and a cover, and multi-piece solid golf balls having a plurality of intermediate layers.

The materials for the cover and intermediate layer are not critical. There may be used any of molding materials commonly used in the manufacture of golf balls by injection molding, for example, thermoplastic resins, typically ionomer resins.

In the case of two-piece solid golf balls, the cover usually has a thickness of about 0.5 to 3 mm. In the case of three-piece solid golf balls, the cover usually has a thickness of about 0.5 to 3 mm and the intermediate layer usually has a thickness of about 0.3 to 3 mm.

The golf balls molded using the injection mold of the invention have covers or intermediate layers of uniform thickness even when the covers or intermediate layers are as thin as 1 mm or less. The steric arrangement of gates adapted to the cavity geometry permits a cover or intermediate layer to be formed to a uniform thickness. The golf balls are free of weld lines and other molding defects.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A golf ball injection mold comprising a spherical cavity having an equator, a north pole and a south pole, said mold having a parting plane substantially at a cavity equator and retractable core support pins disposed in the vicinity of the north and south poles of the cavity, an annular runner formed at the parting plane nearly surrounding the cavity equator and connected to an injection molding machine, 4 to 12 nozzle-shaped runners disposed along the inner periphery of the annular runner and extending radially with respect to the cavity center and provided at their inner ends with gates which are open to the cavity on the cavity equator at equal intervals, second runners extending from said annular runner toward the north and south poles of the cavity and connected to gates which are open to the cavity at the north and south poles respectively, and gas vents disposed at the intersections between latitudinal weld lines and longitudinal weld lines which are formed by a molding resin injected into the mold cavity through the gates on the cavity equator and the gates at the north and south poles, wherein the nozzle-shaped runners and the second runners are formed to a substantially equal inner diameter of 2 to 6 mm, and the gates on the cavity equator and the gates at the north and south poles are formed to a diameter of 0.3 to 2 mm.

2. The mold of claim 1 further comprising a plurality of core support pins disposed for motion into and out of the cavity in an area of each of the north and south hemispheres of the cavity that extends between latitudes of 30° and 60°.

3. The mold of claim 2 wherein a gas vent is defined between each of the core support pins and a hole receiving the pin.

4. The mold of claim 1, wherein the second runners each have a U-shape extending vertically from the annular runner, then horizontally and again vertically toward the north and south poles respectively.

5. The mold of claim 2, wherein the core support pins are disposed at every two gas vents.

* * * * *